No. 807,455. PATENTED DEC. 19, 1905.
W. A. FRY.
DRAFT EQUALIZER FOR VEHICLES.
APPLICATION FILED DEC. 21, 1904
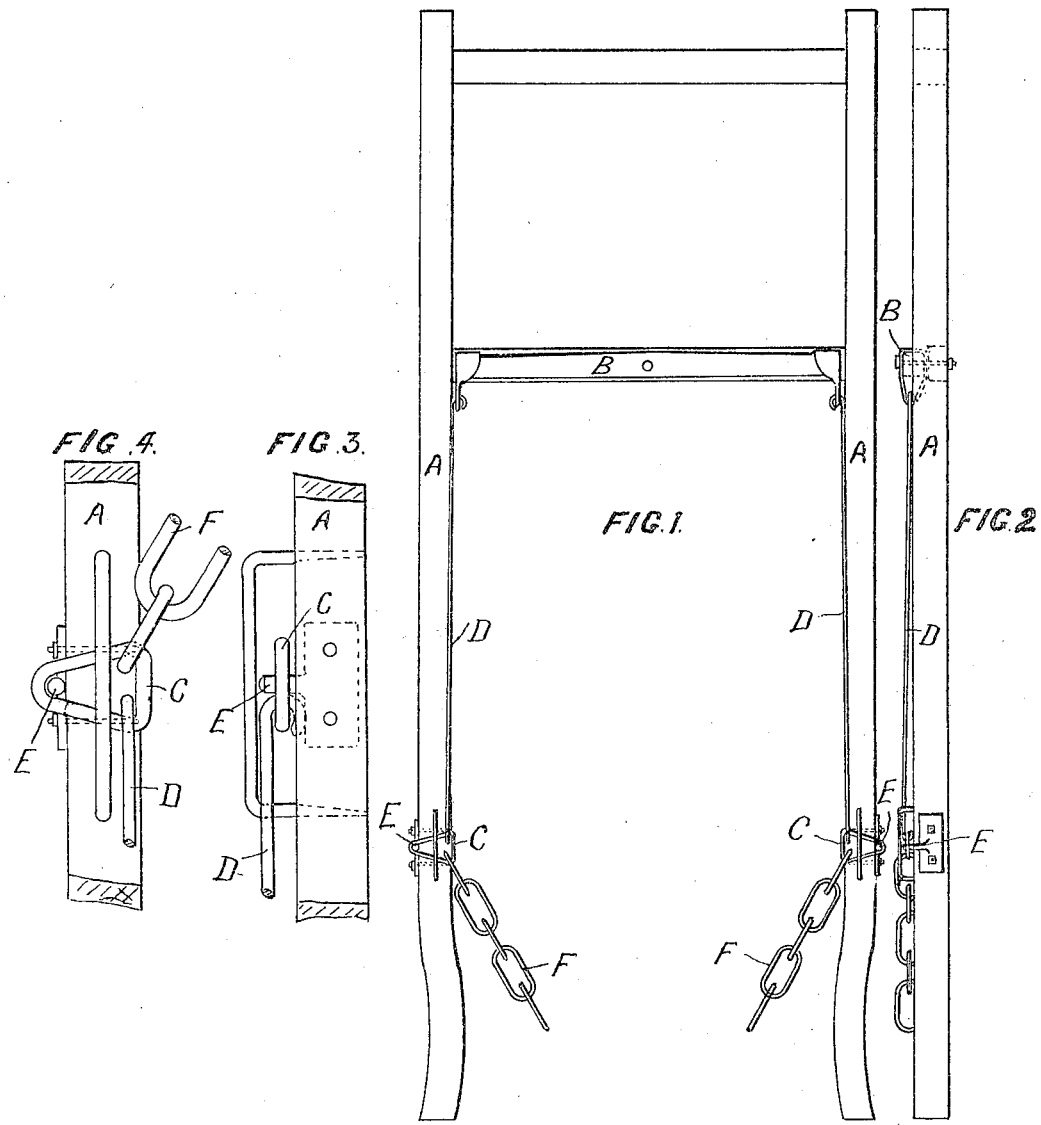
William A. Fry, Inventor

UNITED STATES PATENT OFFICE.

WILLIAM ARTHUR FRY, OF WASHINGTON, DISTRICT OF COLUMBIA.

DRAFT-EQUALIZER FOR VEHICLES.

No. 807,455.      Specification of Letters Patent.      Patented Dec. 19, 1905.

Application filed December 21, 1904. Serial No. 237,775.

*To all whom it may concern:*

Be it known that I, WILLIAM ARTHUR FRY, a citizen of the United States, residing at Lanier Heights, Washington, in the District of Columbia, have invented new and useful Improvements in Draft-Equalizers for Vehicles; and I do hereby declare that the following is a full, clear, and exact description of the invention, which will enable others skilled in the art to which it appertains to make and use the same, reference being had to the accompanying drawings, and to letters of reference marked thereon, which form part of this specification.

My invention relates to special improvements in devices for attaching animals—such as horses, mules, &c.—to carts or other vehicles, so as to equalize the pressure of the collar or draft on the animal's shoulders, at the same time giving the animals proper control of the vehicle in turning.

This invention is to accomplish the same purpose as that of a patent granted to me on the 12th day of March, 1888. My improvement over said invention is to substitute a rocking motion instead of a sliding motion, and thus prevent wear.

The invention is shown in the accompanying drawings, in which—

Figure 1 is a top view of a pair of cart-shafts with my invention shown in place. Fig. 2 is a side view of same. Figs. 3 and 4 are details showing construction of swing-link and pin.

A A are a pair of cart-shafts as ordinarily used.

B is a whiffletree attached to cross-bar of shafts in any desirable manner, preferably by a bolt passing through the whiffletree and cross-bar, as shown.

C C are swinging links connecting the trace-chains and tugs and so formed as to embrace the pintles E E and oscillate on same.

D D are traces connecting swing-links and whiffletree. These may be made of rods, ropes, or chains.

E E are pintles formed so as they can be bolted to the cart-shafts and afford a bearing for the swinging links C C to work upon.

F F are tug-chains connecting swinging links and hames or collar on animals.

The object of this invention is to relieve the unequal pressure caused by the short tug-chains usually employed in attaching animals to carts and to afford the benefit the yielding motion of a whiffletree gives to the animal's shoulders, at the same time retaining the control of the vehicle, the draft being near the points of the shafts, thereby steadying them.

I claim—

In an attachment for equalizing the draft, the combination of a plate carrying a vertical integral pin, extending above the outside of the shaft, and adapted to receive a swinging link interposed on the tug between its ends.

In testimony whereof I affix my signature in presence of two subscribing witnesses.

WILLIAM ARTHUR FRY.

Witnesses:
HERMAN E. BURGESS,
JOHN O'MALLEY.